United States Patent
Bowe et al.

(10) Patent No.: US 9,623,795 B2
(45) Date of Patent: Apr. 18, 2017

(54) MOUNTING BASE

(71) Applicants: Delores Tasneen Bowe, Ann Arbor, MI (US); Peter Ellis Hackett, Belleville, MI (US)

(72) Inventors: Delores Tasneen Bowe, Ann Arbor, MI (US); Peter Ellis Hackett, Belleville, MI (US)

( * ) Notice: Subject to any disclaimer, the term of this patent is extended or adjusted under 35 U.S.C. 154(b) by 0 days.

(21) Appl. No.: 15/353,794

(22) Filed: Nov. 17, 2016

(65) Prior Publication Data

US 2017/0066370 A1 Mar. 9, 2017

Related U.S. Application Data

(63) Continuation-in-part of application No. 14/658,053, filed on Mar. 13, 2015, now Pat. No. 9,327,641.

(51) Int. Cl.
*B60Q 1/00* (2006.01)
*B60Q 1/26* (2006.01)
*B60R 13/00* (2006.01)

(52) U.S. Cl.
CPC .......... *B60Q 1/2615* (2013.01); *B60Q 1/2611* (2013.01); *B60R 13/00* (2013.01)

(58) Field of Classification Search
CPC ...... B60Q 1/2611; B60Q 1/2615; B60R 13/00
See application file for complete search history.

(56) References Cited

U.S. PATENT DOCUMENTS

| | | | | |
|---|---|---|---|---|
| 5,491,621 A | * | 2/1996 | Duty | F21V 19/009 362/396 |
| 2006/0273121 A1 | * | 12/2006 | Thomas | B60R 9/058 224/322 |
| 2007/0153537 A1 | * | 7/2007 | Scott | B60Q 1/26 362/503 |

* cited by examiner

*Primary Examiner* — Thomas M Sember
(74) *Attorney, Agent, or Firm* — Thomas P. Heed

(57) ABSTRACT

A vehicle-roof mounting-base intended to temporarily mount lights, signs, kayaks, ladders, bicycles, and cameras, inter alia, on the roof of a vehicle with a steel or non-ferrous roof. The vehicle-roof mounting-base uses vacuum evacuation to adhere itself to a vehicle roof. The vacuum evacuation is accomplished by evacuating suction cups, which are in intimate contact with the vehicle roof, through the use of a vacuum pump. The vacuum pump is connected to a vacuum sensor, which can turn the vacuum pump on and off, insuring that sufficient retention force to hold the vehicle-roof mounting-base to the vehicle roof exists.

22 Claims, 6 Drawing Sheets

MOUNTING BASE

CLAIM OF PRIORITY

This U.S. utility patent application is a continuation-in-part of U.S. utility patent application Ser. No. 14/658,053, filed Mar. 13, 2015.

FIELD OF INVENTION

This invention relates to the classes Illumination; and Card, Picture, or Sign Exhibiting. Specifically, this invention relates to the classes and sub-classes for mounting a sign or light on the roof of a vehicle.

BACKGROUND OF INVENTION

The Ford F-Series pick-up truck is the largest selling single vehicle line in North America, and it comes with substantial externalities. Estimates are that the F-150, alone, will account for over 700,000 units sold in 2015. Over $15 Billion in F-Series trucks are sold annually. The F-150 is used not only as a personal vehicle, but also as a work vehicle, for literally, millions of Americans. Additionally, many F-150 pick-up trucks are used by utilities, municipalities, and emergency services.

Through the 2014 model year, the F-150 has used a traditional steel construction: steel frame, steel body structure, and steel box. The steel construction allows workers, utilities, municipalities, and emergency services to mount a wide variety of signs and lights to the roof of the F-150. Many of these signs and lights are mounted only temporarily, using high-powered magnets.

In 2014, the variants of the F-150 achieved EPA combined mileage varying from a low of 13 miles per gallon for the Raptor (4WD, V8) to a high of 18 miles per gallon for the base model (2WD, V6). In 2014, the Corporate Average Fuel Economy ("CAFE") Standard for an F-150 was 23 miles per gallon. The CAFE Standard for cars and light trucks are going to be continually increased at a rate of 5% per year, until 2025. By 2025, the CAFE Standard for a combined maker's fleet is supposed to be over 50 miles per gallons. By 2025, the CAFE Standard for a full-size pick-up truck the size of the 2014 F-150 will be 30 miles per gallon. Failure to reach the CAFE Standard results in a per vehicle penalty to the automaker. The penalty can be quite substantial.

The CAFE Standard increase was a response to the externalities of petroleum. Petroleum causes pollution, comes from unreliable sources, and varies, substantially, in price. The pollution from burning fossil fuels, such as petroleum, makes the air in many major cities, such as Mexico City, Beijing, and Los Angeles, unhealthy to breathe for many people. In the U.S., much of the country has been designated an Ozone Attainment Area, and need to use a special formulation of gasoline during the summer to reduce ozone. Drilling for petroleum is also fraught with hazard. Witness the BP drilling catastrophe in the Gulf of Mexico in 2010 or the grounding of the Exxon Valdez in 1989. The sales of petroleum give undue influence to the governments who control exportable quantities of the resource, such as Russia, Venezuela, and Saudi Arabia. Petroleum is becoming increasingly scarce, meaning that the price is rising, generally, and is subject to wide and unpredictable swings in price. This has led to volatility in the oil markets, with the cost of a barrel of oil spiking at $140 per barrel in 2008, as global demand peaked; and falling to a low of $55 per barrel in early 2015, as global demand softened. It is expected that the price will quickly rise as economic activity in the BRIC countries (Brazil, Russia, India, and China) rebound from slower growth.

In order to address the challenges posed by the new CAFE Standards, starting in 2015, Ford will use aluminum alloys in the body of the F-150 to shave off as much as 700 pounds of weight. Ford promises that the new F-150 will be a "segment changer," substantially improving the overall fuel efficiency of a pick-up truck without sacrificing power or towing capacity. In 2015, it is estimated that the new, aluminum, F-150 pick-up truck will surpass the volume of all aluminum-intensive cars and light trucks built to date.

The 2015 F-150 frame is still made from steel. However, the body and underlying structure are almost entirely 5000/6000 series aluminum alloy. Ford developed a proprietary method of heat treating that increases bend resistance. The cab's structural cage is hydro-formed aluminum. Glue and rivets are used to join the aluminum, rather than welds.

As a result of the 2015 Ford F-150's body, temporary signs and lights, those using magnets, will no longer work. Aluminum is a non-ferrous metal, and the magnets will not stick to it. This is an unintended consequence of Ford's decision to go to an aluminum body. The market has not, yet, addressed this concern.

REVIEW OF THE PRIOR ART

The current prior art has not established a suitable, temporary mounting base to be used on the roof of aluminum-body vehicles. The prior art discloses many examples of signs and lights that are permanently mounted to vehicle roofs, such as U.S. Pat. No. 8,425,098 (mechanically attached lightbar with GPS capability); U.S. Pat. No. 7,387,414 (through-hole mounted lightbar); U.S. Pat. No. 5,931,573 (permanently mounted lightbar that pivots); U.S. Pat. No. 5,558,424 (permanently mounted lightbar that can be raised); U.S. Pat. No. 4,839,975 (vehicle topper sign). Such inventions, by their very nature, are not capable of being temporarily mounted and easily removed from a vehicle roof.

The prior art discloses many examples of signs and lights that are temporarily or permanently mounted to vehicle roofs using straps or mechanical clamps, such as U.S. Pat. No. 7,244,053 (lightbar with mounting using feet and straps on a roof ridge); U.S. Pat. No. 5,132,666 (variation of triangular topper sign with c-hooks and straps for mounting); and U.S. Pat. No. 4,787,163 (variation of triangular topper sign with c-hooks and straps for mounting). Two problems arise with using straps and hooks to temporarily mount a light or a sign to a vehicle roof: (1) the mount only works if the roof has to have a suitable ridge; and (2) the mount is time-consuming and difficult to put-on and take-off the vehicle.

The prior art discloses many examples of signs and lights that are temporarily mounted to vehicle roofs using magnets, such as U.S. Pat. No. 6,082,880 (topper sign for funeral procession temporarily mounted with magnets); U.S. Pat. No. 5,711,100 (topper sign with magnets that can pivot to fit the contour of the vehicle roof, intended for temporary mounting); and U.S. Pat. No. 4,574,726 (mast with distress sign temporarily mounted with magnets). Clearly, magnetic mounts will not work with an aluminum-bodied vehicle.

The prior art discloses many examples of signs and lights that are temporarily mounted to vehicle roofs using suction cups, such as U.S. Pat. No. 7,347,018, U.S. Pat. No. 7,213,356, U.S. Pat. No. 7,069,679, and U.S. Pat. No. 6,892,486 (a family of patents for attaching a banner to a vehicle roof using suction cups). U.S. Pat. No. 3,936,967 discloses a sign that can be affixed to a stationary car. US utility patent application publication number 20060273121 ("application '121") discloses a lightbar held in place with suction cups. Application '121 was abandoned, presumably because the inventor discovered that mere suction cups are not suitable to temporarily affix a lightbar to a moving vehicle.

The only prior art that discloses using a vacuum with respect to a light or a sign does not involve a vehicle and does not involve a mounting base: U.S. Pat. No. 4,183,160 discloses a display case that uses a patent to hold a document flat against the display glass ("patent '160"). The display case in patent '160 is not in motion, and the display case in patent '160 is not affixed to a surface. As such, patent '160 does not teach anything that is really germane to a discussion of the prior art for the present invention. Clearly, with the advent of the new, aluminum F-150, the market needs a non-permanent method to affix a sign or light arrangement to an aluminum vehicle roof, and the prior art neither discloses nor anticipates such a device.

U.S. utility patent application Ser. No. 14/658,053, by the named inventors of this application, overcomes most of the problems of the prior art by using a vacuum pump and a continuous, gas impermeable seal, to adhere a sign base to a flat, surface, such as a truck roof, using suction. The prior patent application requires a relatively flat surface on which to be mounted. Since there are many surfaces that are convex or ridged, a more universal mounting system was still required. The instant patent application overcomes the problems with the prior patent application.

SUMMARY OF THE INVENTION

The present invention improves and expands on the prior art, and on application Ser. No. 14/658,053. The present invention uses vacuum sealed suction cups to temporarily affix a mounting base to the roof of a vehicle. The mounting base can be used as a mounting platform for lights, signs, kayaks, ladders, bicycles, or anything else that is intended to be temporarily mounted on the roof of a vehicle with a steel roof, or with a non-ferrous roof, such as an aluminum roof.

The present invention has a base, a case, a plurality of suction cups, and at least one of manifolds, mounting brackets, vacuum pumps, hoses, nozzles, vacuum sensors, electrical wires, and power cables ("assembly"). The base is a rigid platform made from a stiff, environmentally durable material such as poly(methyl-methacrylate) ("PMMA" or tradenames Plexiglass or Lucite®), polycarbonate ("PC" or tradename Lexan®), acrylonitrile butadiene styrene ("ABS"), steel, or aluminum. The case encloses at least one of vacuum pumps, hoses, nozzles, and the various wires and hardware associated with each. The at least one vacuum pumps are mounted to the base. The case is connected to the base with a durable fastener, such as rivets, screws, heat sealing, or adhesive. Typically, the case is made from a durable polymer such as ABS, polypropylene ("PP"), PMMA, PC, high-density polyethylene ("HDPE"), or low-density polyethylene ("LDPE"). In lighting applications, the case can be made out of PC, PMMA, or other clear or semi-transparent plastic. A sign can be printed directly on the case, or a sign can be mounted to the top of the case.

The assembly has a plurality of suction cups. At least one vacuum pump with at least one nozzle is attached to the plurality of suction cups, using a plurality of hoses and manifolds. The at least one vacuum pump can be attached directly to the at least one manifold. In an alternative embodiment, at least one hose can be used to attach the at least one vacuum pump to the at least one manifold. A continuous gas impermeable seal forms between each of the plurality of suction cups, and the nearly flat surface on which it is mounted (e.g., a vehicle roof). By using a plurality of suction cups, the present invention can be securely mounted to roofs that have significant curvature as well as roofs that have ridges or raised planes. When the at least one vacuum pump is on, it evacuates air from the volume enclosed by the plurality of suction cups, creating a vacuum seal. The at least one vacuum sensor shuts off the at least one vacuum pump when the pressure within the enclosed volume of the plurality of suction cups falls below a pre-defined retention pressure. The at least one vacuum sensor turns on the vacuum pump if enough air leaks out of the enclosed volume of the plurality of suction cups, so that the enclosed volume pressure rises above the pre-defined retention pressure. The at least one vacuum sensor can be either a low-cost differential pressure sensor, and the associated circuitry, or a pressure switch calibrated to close when the pressure in the enclosed volumes exceeds the pre-defined retention pressure. The retention pressure for a particular assembly design will be proportional to a retention force.

The plurality of suction cups are attached to the at least one manifold using a ball joint. Each suction cup has a vacuum channel extending radially upward through its centerline and the ball of the ball joint. The plurality of suction cups are fabricated from a gas-impermeable material, such as silicon, butyl rubber, nitrile rubber, or thermoplastic elastomers (TPE). The suction cups can also be of compound construction, in which the upper part of the suction cups (the part in contact with the ball assembly and manifold) is made from a durable material, such as ABS, PP, PMMA, PC, HDPE, LDPE, steel, or aluminum. The lower part of a compound suction cup is made of silicon, butyl rubber, nitrile rubber, TPE, or similar gas impermeable sealing material. Compound suction cups are used to contour the seal to more nearly match particular roof applications, or to create a larger stand-off between the roof and the base, thus enclosing a larger volume. The plurality of suction cups is permanently attached to the manifold with a ball assembly. The at least one vacuum pump, acting through the manifold, evacuates air from the suction cups. The manifold provides some structural rigidity and is connected to mounting bracket on top and a plurality of ball assemblies on the bottom.

The suction cups is securely attached to the ball assembly using an adhesive, a force fit, ultrasonic welding, overmolding, threads, or other gas impermeable attaching methods. A vacuum channel is durably formed on the inside of the ball assembly, extending from the vacuum channel of the manifold to the interior volume of the suction cup. The ball assembly allows the suction cup to be rotated, in any direction, about 60°. The opening for the ball assembly, and the length of the ball assembly shaft, dictate the degree of rotation of the suction cup and ball assembly. The ball assembly is held in place in the manifold with a retention clip.

The suction cup dimensions depend on the application and the material. For roofs that have ridges or drainage channels, a suction cup material that quickly and easily forms to contours, such as silicon, should be used.

The vacuum hoses are made from standard flexible automotive vacuum hose materials such as neoprene, silicon, HDPE, LDPE, and flex steel. In embodiments using vacuum hoses, the vacuum hose connects the vacuum pump to the manifold. The nozzle can either be on the vacuum pump side of the hose or the manifold side of the hose. The one or more vacuum nozzles are one-way gas valves, which allow air to be sucked out of the volume enclosed by the suction cups, but does not allow air to infiltrate the enclosed volume through the nozzles.

The one or more vacuum pumps are mounted to the base. The one or more vacuum pumps can either be directly attached to the one or more nozzles, or they can be attached to the one or more nozzles through the one or more vacuum hoses. The nozzles allow the vacuum to evacuate the enclosed volume of the suction cups by removing air (i.e., reducing pressure). Although any type of vacuum pump may be used, in the exemplary embodiment, the at least one vacuum pump is a traditional constant displacement pump that exhausts to atmospheric pressure. The constant displacement pump can be of any construction, but an inexpensive dry displacement pump is preferred. Examples of an inexpensive, dry displacement pump would be one of rotary vane, or diaphragm construction.

The present invention will remain in place on the roof of a moving vehicle as long as the coefficient of static friction, between the plurality of the suction cups' seals, and the roof, multiplied by the normal force of the base on the vehicle roof exceeds the inertial force of the mounting-base due to vehicle acceleration plus the force due to wind resistance. The normal force is the force due to gravity of the assembly (base, suction cups, case, one or more vacuum pumps, the plurality of hose, one or more nozzles, one or more actuators, and associated wires), plus the retention force created within the enclosed volume of the suction cups by the vacuum pump. The relationship, generally, can be given by the equation $$\mu_s(F_R+F_G)>F_i+F_w \qquad (1)$$

where $\mu_s$ is the coefficient of static friction between the seal of each suction cup and the roof; $F_R$ is the retention force provided by the summation of the suction cups, normal to the roof surface, due to reduced pressure in the enclosed volume (for simplicity sake, $F_R$ is the summation of the retention force attributable to each of the plurality of suction cups); $F_G$ is the force of gravity of the assembly; $F_i$ is the force of inertia of the assembly under maximum vehicle acceleration; and $F_w$ is the wind resistance. The force of inertia is proportional to the acceleration of the vehicle. The force of wind resistance is proportional to the square of the velocity of the vehicle. Considerations such as the maximum cross wind, the cross-sectional size of the assembly, the effect of roof grime on the coefficient of friction, and the relationship between velocity and acceleration for applicable vehicles are left to the skilled mechanic to experimentally determine. The key to success is that the retention force must be high enough that equation (1) is always true.

BRIEF DESCRIPTION OF THE DRAWINGS

The present invention, a vehicle-roof mounting-base, is illustrated with twelve drawings.

DETAILED DESCRIPTION

The following descriptions are not meant to limit the invention, but rather to add to the summary of invention, and illustrate the vehicle-roof mounting-base using evacuation with a vacuum. The present invention can be used as a mounting base for signs, lightbars, emergency lights, spot lights, and lighted signs. The present invention is the mounting base, itself.

Figure 1:
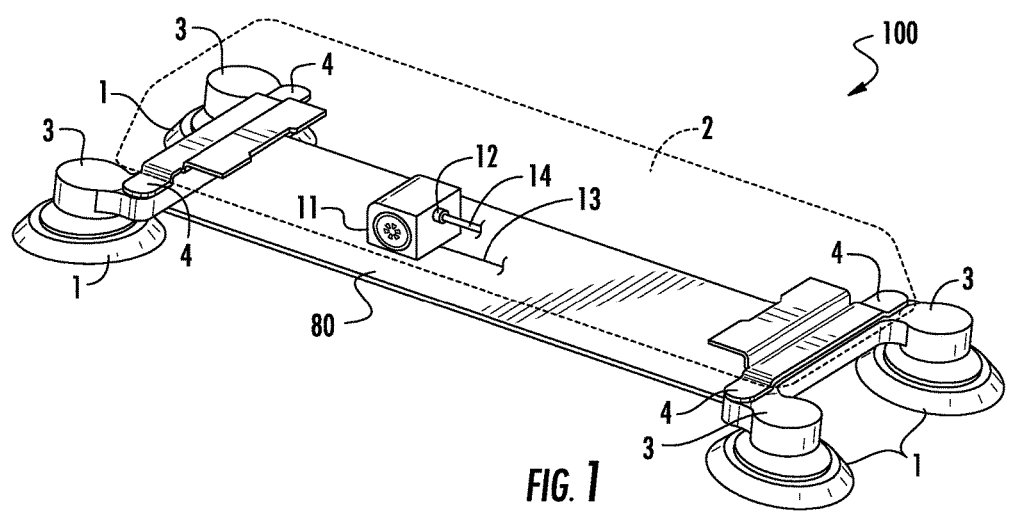
FIG. 1 shows an elevated isometric view of the present invention.

FIG. 1 shows an elevated isometric view of the present invention 100. The present invention 100 includes, but is not limited to, a plurality of suction cups 1, a case 2, a base 80, a plurality of manifolds 3, a plurality of mounting brackets 4, one or more vacuum pumps 11, a plurality of hoses (only one shown) 14, a plurality of nozzles 12, and a one or more wires (only one shown) 13 providing electricity to the vacuum pump. The invention can be powered with a standard cigarette lighter power cable or similar device or accessory (not shown). The suction cups 1 are made of silicon, butyl rubber, nitrile rubber, TPE, or similar gas impermeable sealing material. Compound suction cups 1 can be used to contour the seal to more nearly match particular roof applications, or to create a larger stand-off between the roof and the present invention 100, thus enclosing a larger enclosed volume within the suction cup 1.

The manifolds 3 are made of ABS, PP, PMMA, PC, HDPE, LDPE, steel, or aluminum. The mounting brackets 4 are made of ABS, PP, PMMA, PC, HDPE, LDPE, steel, or aluminum. The case 2 is made of ABS, PP, PMMA, PC, HDPE, LDPE, steel, or aluminum.

The vacuum pump 11 is a traditional constant displacement pumps that exhausts to atmospheric pressure. The constant displacement pumps 11 can be of any construction, but inexpensive dry displacement pumps 11 are preferred. Examples of an inexpensive, dry displacement pump 11 would be one of rotary vane, or diaphragm construction. The vacuum hoses 14 are made from standard flexible automotive vacuum hose materials such as neoprene, silicon, HDPE, and flex steel. When the vacuum hose 14 is made from neoprene, silicon, HDPE, or LDPE, it is reinforced with fibers made from polyester or other suitable material. The one or more vacuum nozzles 12 are one-way gas valves, which allow air to be sucked out of the volume enclosed of the suction cups, but does not allow air to infiltrate the enclosed volume through the nozzles 12.

Figure 2:
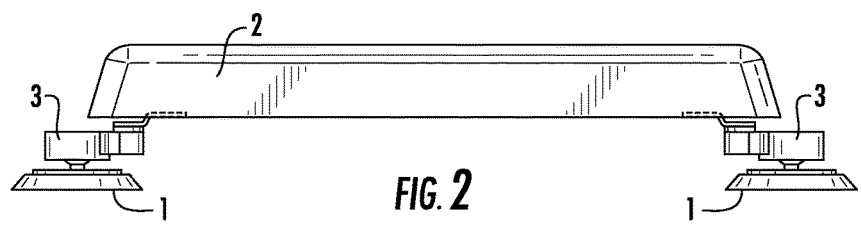
FIG. 2 shows a lateral front view of the present invention.
Figure 3:
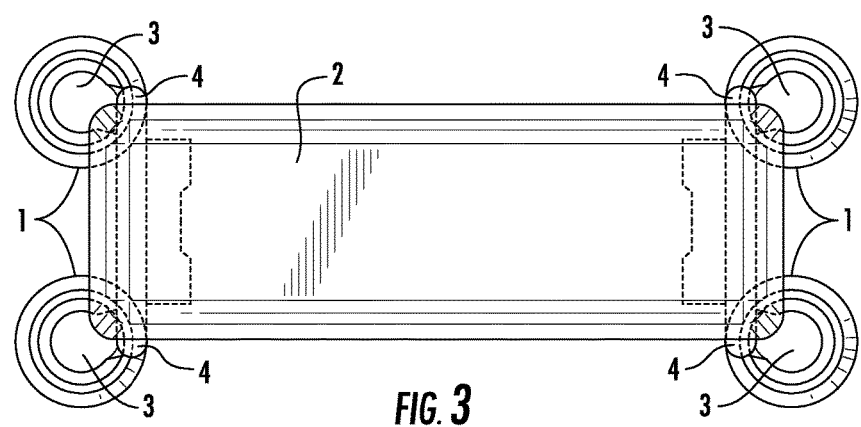
FIG. 3 shows a top view of the present invention.

FIG. 2 shows a lateral side view of the present invention 100. Visible in FIG. 2 are the suction cups 1, manifolds 3, and case 2. FIG. 3 shows a top view of the present invention 100. Visible in FIG. 3 are the suction cups 1, the manifolds 3, the case 2, and the mounting brackets 4.

Figure 4:
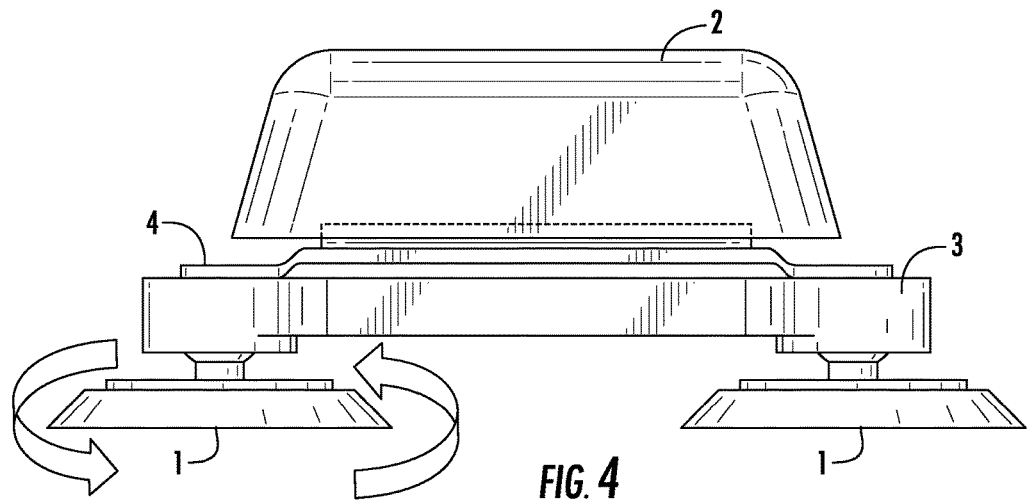
FIG. 4 shows a lateral side view of the present invention.

FIG. 4 shows a lateral end view of the present invention. Visible in FIG. 4 are the suction cups 1, manifold 3, bracket 4, and case 2. The suction cups 1 can pivot and rotate.

Figure 5:
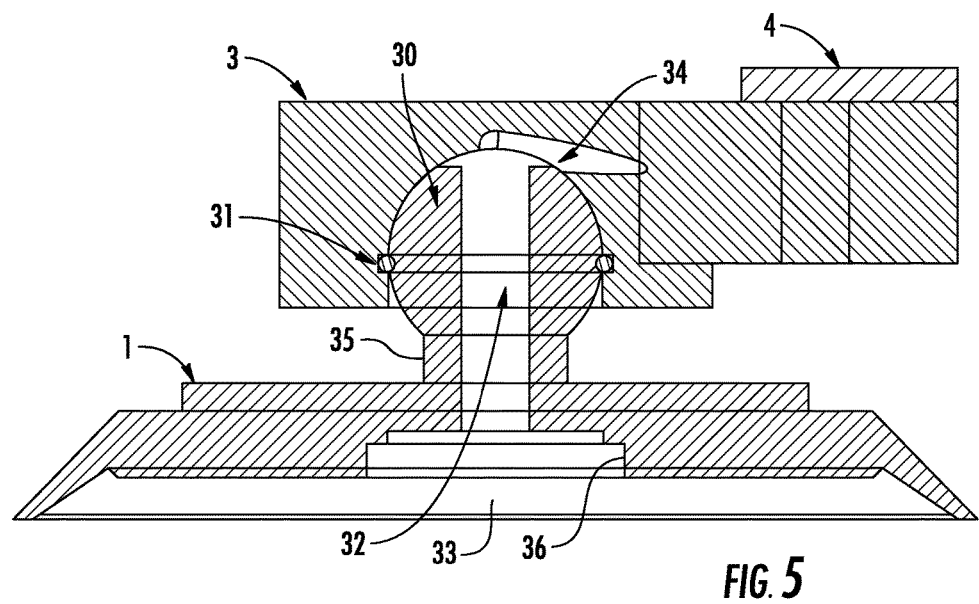
FIG. 5 shows a lateral view of the suction cup and manifold assembly in isolation.
Figure 6:
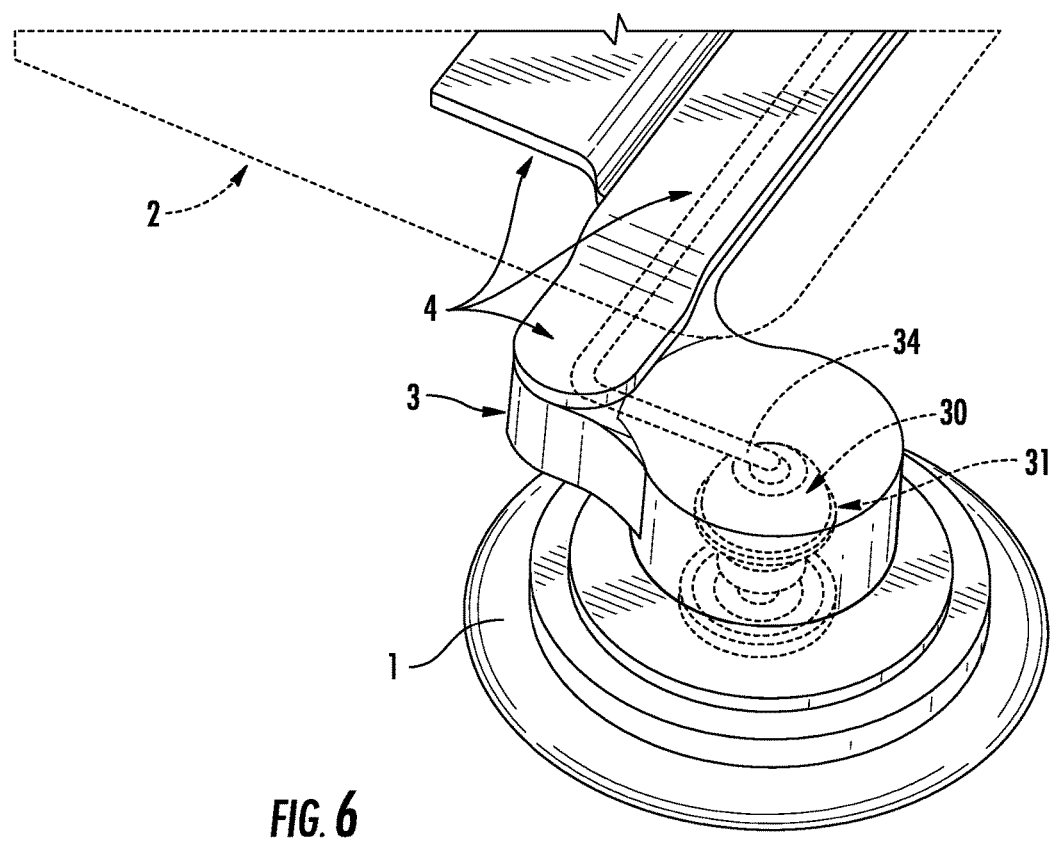
FIG. 6 shows an elevated isometric view of the suction cup and manifold assembly in isolation.

FIG. 5 shows a lateral side view, in isolation, of the suction cup 1 and ball assembly. The ball assembly fits within the manifold 3. The ball assembly is comprised of a ball 30 with a hollow channel 32, a retention clip 31, and a shaft 35. The ball 30 is held in place, in the manifold 3, with a retention clip 31. The retention clip 31 also provides a gas impermeable seal. The ball assembly is attached to the suction cup 1 at the end of the ball assembly shaft 35, using a durable means of adherence such as threads, adhesive, heat bonding, or over-molding. The manifold 3 has a vacuum channel 34 that connects to the ball assembly hollow core 32. The ball assembly hollow core 32 is continuous to the suction cup 1 vacuum chamber 33, 36. The upper part of the vacuum chamber 36 can be used as a means of solidly adhering the suction cup 1 to the ball assembly shaft 35. FIG. 6 shows an elevated isometric view, in isolation, of the suction cup 1 and ball assembly. The suction cup 1, ball 30, retention ring 31, and vacuum channel 34 are visible. The relationship of the ball assembly to the manifold 3, bracket 4, and case 2 are also visible.

Figure 7:
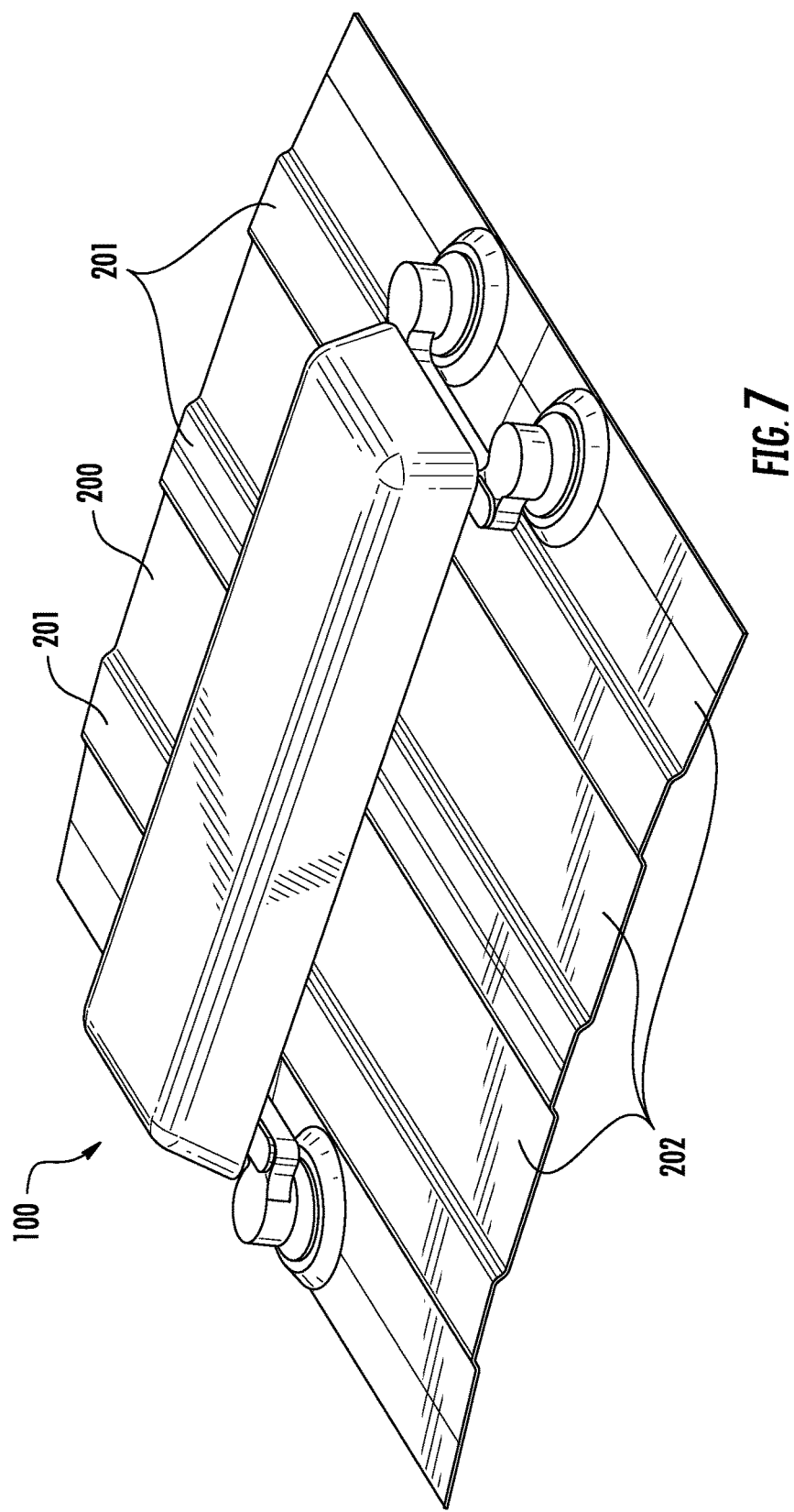
FIG. 7 shows an elevated isometric view of the present invention, in situ.
Figure 8:
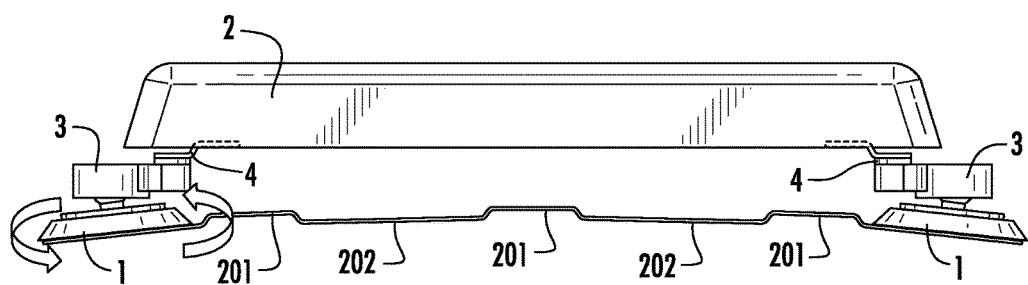
FIG. 8 shows a lateral side view of the present invention, in situ.
Figure 9:
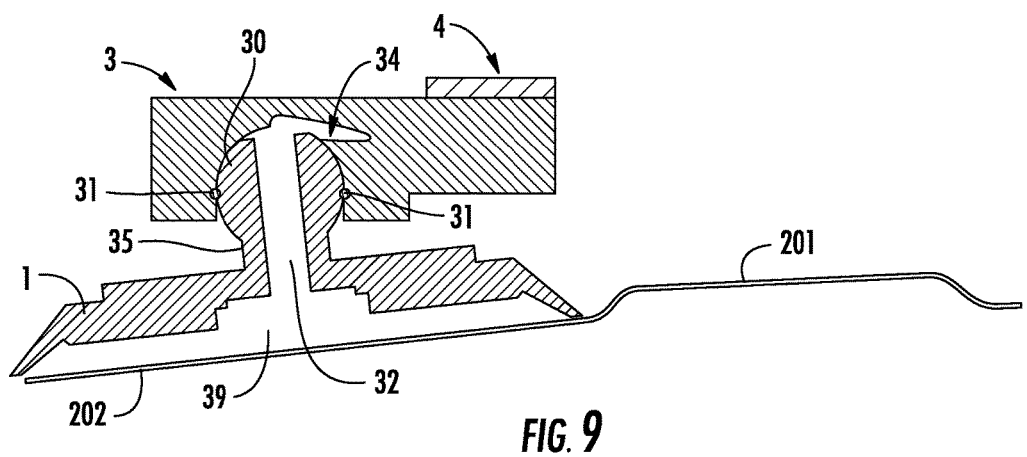
FIG. 9 shows a lateral side view of the suction cup and manifold assembly, in situ, in isolation.

FIGS. 7-9 shows the present invention 100, in situ, on a roof with a roof bead 200. The present invention 100 can be used on other roof surfaces, such as flat roofs, curved roofs, glass roofs, and roofs with drainage channels. The roof 200 has a plurality of flat regions 202 and ridges 201. The present invention 100 allows for a vacuum seal even in the presence of roof ridges 201, because the suction cups 1 are in intimate contact with the flat regions 202 of the roof 200. The suction cups 1 can rotate about the ball assembly 30, 31, 32, 35, so that its perimeter is flush with the flat regions of the roof 202. The vacuum zone 39 of the suction cup can be evacuated by the vacuum pump 11 through the plurality of hoses 12, manifolds 3, ball assembly hollow channel 32, and vacuum channels 34.

Figure 10:
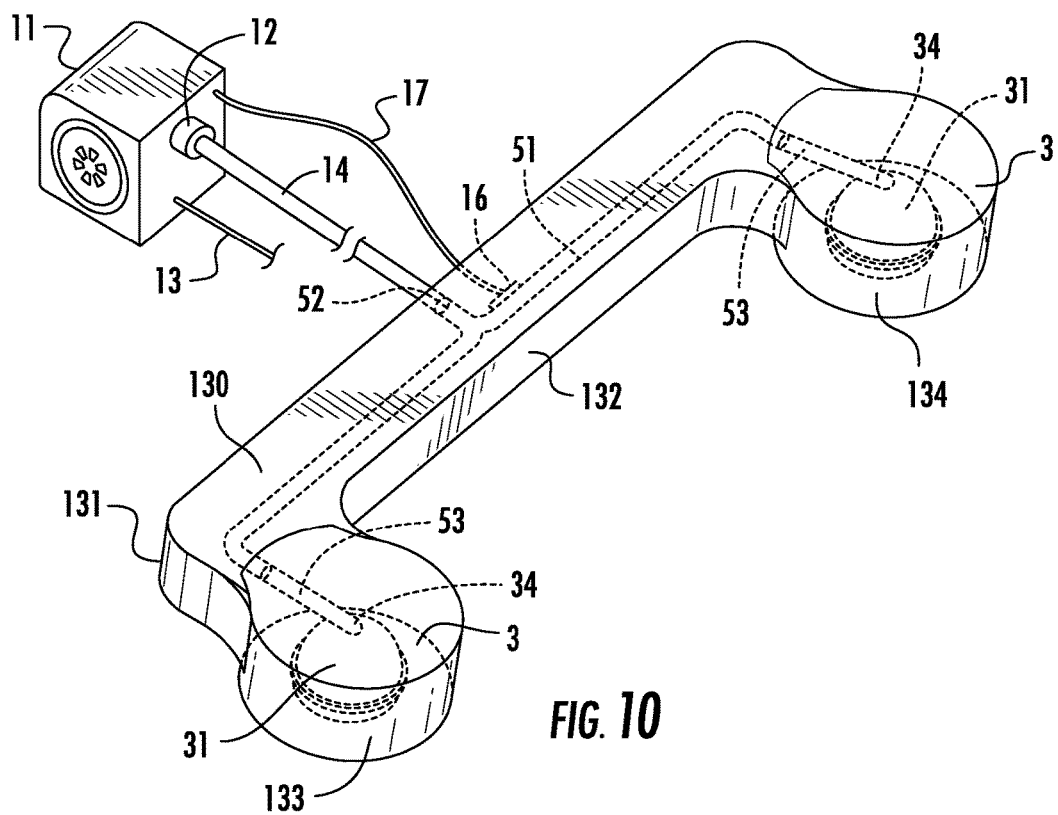
FIG. 10 shows an elevated isometric view of the vacuum pump and manifold assembly in isolation.
Figure 11:
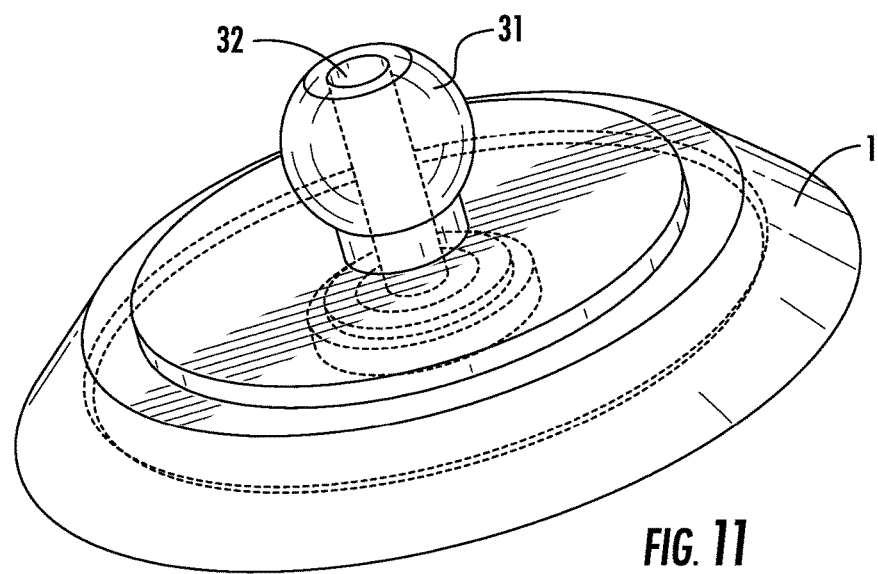
FIG. 11 is an elevated isometric view of the suction cup and ball assembly.

FIG. 10 shows an isometric view of a manifold 3 and vacuum pump 11, in isolation. FIG. 11 shows an isometric isolation of the suction cup 1. The manifold 3 has a plurality of flat surfaces 133, 131, 134, 132, 130. Interior to the plurality of flat surfaces 133, 131, 134, 132, 130 is a vacuum channel 51, 52, 53. The vacuum channel 51, 52, 53 connects the vacuum channel 34 to the hose 14, nozzle 12, and vacuum pump 11. In this way, the suction cup 1, the ball assembly hollow channel 32, vacuum channel 51, 52, 34, hose 14, nozzle 12, and vacuum pump 11 are connected in a gas impermeable manner, allowing the vacuum pump 11 to evacuate the suction cup 1. A vacuum sensor 16, in a feedback loop with the vacuum pump 11, monitors the vacuum pressure to insure a seal. The vacuum sensor 16 is connected, electronically, to the vacuum pump 11, with a wire 17. The vacuum pump is powered via an auxiliary connection to the car's voltage system (e.g., a cigarette lighter) through a power wire 13

We claim:

1. A vehicle-roof mounting-base comprising, a rigid base; a rigid case; at least one manifold; a plurality of gas impermeable suction cups, attached to the at least one manifolds through a ball assembly; at least one vacuum pump; at least one vacuum sensor, including associated circuitry; at least one vacuum nozzle; and a means for powering the at least one vacuum pumps; wherein, when the vehicle-roof mounting-base is placed on a roof of a vehicle, each of the plurality of suction cups makes a gas impermeable seal around an enclosed volume, defined by an inner surface of the suction cup and the roof; the at least one vacuum pump can partially evacuate, through the at least one vacuum nozzle and the at least one manifold, the enclosed volume of each of the plurality of suction cups, thus creating sufficient retention force to adhere the vehicle-roof mounting-base to the vehicle roof.

2. The vehicle-roof mounting-base in claim 1 wherein the at least one vacuum sensor can sense when the pressure within the enclosed volume of the plurality of suction cups reaches a pre-defined pressure and turn off the vacuum pump.

3. The vehicle-roof mounting-base in claim 1 wherein the at least one vacuum sensor can sense when the pressure within the enclosed volume of the plurality of suction cups reaches a pre-defined pressure and turns the vacuum pump on.

4. The vehicle-roof mounting-base in claim 1, further comprising a base, wherein the at least one vacuum pump is mounted to the base.

5. The vehicle-roof mounting-base in claim 4, wherein the rigid base is constructed from ABS, PMMA, PC, steel, or aluminum.

6. The vehicle-roof mounting-base in claim 1, wherein the at least one manifold is attached to the base.

7. The vehicle-roof mounting-base in claim 6, further comprising at least one mounting bracket, wherein the at least one mounting bracket is attached to the base; and wherein the at least one manifold is attached to the at least one mounting bracket.

8. The vehicle-roof mounting-base in claim 1, further comprising a case, wherein the case encloses the at least one vacuum pump.

9. The vehicle-roof mounting-base in claim 8, wherein the case is constructed from ABS, PMMA, PC, PP, HDPE, or LDPE.

10. The vehicle-roof mounting-base in claim 9, wherein the vehicle-roof mounting-base is used to support a light-bar, wherein the light-bar is attached, externally, to the top of the case, and wherein the light-bar contains a one or more lighting elements.

11. The vehicle-roof mounting-base in claim 9, wherein the vehicle-roof mounting-base contains a light assembly, internal to the case, wherein the case is, at least partially, fabricated from a transparent material; and wherein said light assembly comprises one or more lighting elements.

12. The vehicle-roof mounting-base in claim 1, wherein the plurality of suction cups is fabricated, in whole or in part, from silicon, butyl rubber, nitrile rubber, or thermoplastic elastomer ("TPE").

13. The vehicle-roof mounting-base in claim 1, wherein the plurality of suction cups are of compound construction, wherein an upper portion is constructed from ABS, PMMA, PC, PP, HDPE, LDPE, steel, or aluminum; and a lower portion, fused, attached, over-molded, threaded, or adhered to the upper portion, is constructed from silicon, butyl rubber, nitrile rubber, or TPE.

14. The vehicle-roof mounting-base in claim 1, wherein the vacuum pump is a displacement pump.

15. The vehicle-roof mounting-base in claim 14, wherein the displacement pump is of rotary vane or diaphragm construction.

16. The vehicle-roof mounting-base in claim 1, wherein the vacuum sensor is comprised of a pressure switch.

17. The vehicle-roof mounting-base in claim 1, wherein the vacuum sensor is comprised of a differential pressure sensor.

18. The vehicle-roof mounting-base in claim 1, further comprising at least one vacuum hose, attached between the at least one vacuum pump and the at least one manifold; wherein the at least one vacuum hose is constructed from at least one of flex steel, fiber-reinforced neoprene, fiber-reinforced silicon, fiber-reinforced HDPE, and fiber-reinforced LDPE.

19. The vehicle-roof mounting-base in claim 1, wherein the plurality of ball assemblies are comprised of a ball, a retention ring, a shaft, and a hollow channel; and wherein the plurality of ball assemblies and suction cup are held in place in the at least one manifold with the retention ring.

20. The vehicle-roof mounting-base in claim 19, wherein the plurality of suction cups are durable attached to the plurality of ball assemblies using at least one of adhesive, a force-fit, threads, over-molding, and ultra-sonic welding.

21. The vehicle-roof mounting-base in claim 1, wherein the vehicle-roof mounting-base is used to mount a sign on top of a vehicle roof.

22. The vehicle-roof mounting-base in claim 1, wherein the vehicle-roof mounting-base is used to mount a light on top of a vehicle roof.

\* \* \* \* \*